United States Patent [19]

Griswold et al.

[11] Patent Number: 4,584,125
[45] Date of Patent: Apr. 22, 1986

[54] ANTIFOAM COMPOSITIONS

[75] Inventors: Roy M. Griswold, Hudson; Eugene R. Martin, Onsted, both of Mich.

[73] Assignee: SWS Silicones Corporation, Adrian, Mich.

[21] Appl. No.: 639,555

[22] Filed: Aug. 10, 1984

[51] Int. Cl.$^4$ .................. B01D 17/00; B01D 19/04
[52] U.S. Cl. .................. 252/358; 252/321; 556/450
[58] Field of Search .................. 252/358, 321

[56] References Cited

U.S. PATENT DOCUMENTS

| | | | |
|---|---|---|---|
| 3,113,930 | 12/1963 | Chevalier | 252/358 |
| 3,395,102 | 7/1968 | Leyshon et al. | 252/358 X |
| 3,666,681 | 5/1972 | Keil | 252/358 |
| 3,673,105 | 6/1972 | Curtis et al. | 252/358 X |
| 3,883,628 | 5/1975 | Martin | 264/54 |
| 3,923,683 | 12/1975 | Michalski et al. | 252/321 |
| 3,935,121 | 1/1976 | Lieberman et al. | 252/321 |
| 4,005,044 | 1/1977 | Raleigh | 252/358 |
| 4,071,468 | 1/1978 | Abel | 252/358 X |
| 4,145,308 | 3/1979 | Simoneau et al. | 252/358 X |
| 4,194,988 | 3/1980 | Schneider et al. | 252/312 |
| 4,225,456 | 9/1980 | Schmidt et al. | 252/321 |
| 4,274,977 | 6/1981 | Koerner et al. | 252/358 |
| 4,313,917 | 2/1982 | Ohta | 252/358 X |
| 4,406,817 | 9/1983 | Muller et al. | 252/358 |
| 4,443,359 | 4/1984 | Shimizu et al. | 252/358 |
| 4,504,410 | 3/1985 | Hempel et al. | 252/321 |
| 4,514,319 | 4/1985 | Kulkarni et al. | 252/321 X |

Primary Examiner—John F. Terapane
Assistant Examiner—Catherine S. Kilby

[57] ABSTRACT

Compositions which either reduce or prevent foam formation in aqueous or nonaqueous systems comprising (A) a foam destabilizing agent containing (1) a diorganopolysiloxane having the average formula

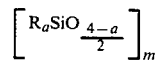

where R is a monovalent hydrocarbon radical having from 1 to 50 carbon atoms, in which an average of at least one R group contains from 6 to 50 carbon atoms, a has an average value of from about 1.8 to 2.2, and m has an average value greater than 3, and (2) an amine containing compound selected from an aminofunctional organopolysiloxane and/or an organic amine having the formula

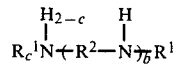

where $R^1$ is a monovalent hydrocarbon radical having from 1 to 25 carbon atoms, $R^2$ is a divalent hydrocarbon radical having from 1 to 10 carbon atoms, with the proviso that at least one of the radicals represented by $R^1$ or $R^2$ must have at least 6 carbon atoms, b is 0, 1 or 2, c is 0 or 1, (B) a nonaqueous dispersing agent, (C) an inorganic filler and (D) water, if desired.

16 Claims, No Drawings

ANTIFOAM COMPOSITIONS

The present invention relates to antifoam compositions and more particularly to antifoam compositions which will prevent or abate foaming in aqueous and nonaqueous systems.

BACKGROUND OF THE INVENTION

Antifoam compositions containing linear diorganopolysiloxanes such as dimethylpolysiloxanes have been widely used as defoamers in, for example, jet dyeing of textile materials.

Aqueous silicone emulsions containing dimethyl silicone fluids have been described, for example, in U.S. Pat. No. 4,194,988 to Schneider et al for defrothing purposes in which the dimethylpolysiloxanes are mixed with an emulsifier containing mono- or diesters of orthophosphoric acid until a clear solution is obtained and then an organic base or alkali is added to neutralize the clear solution.

Antifoam compositions for aqueous systems have been described in U.S. Pat. No. 3,666,681 to Keil, which contain (A) a water insoluble organic liquid such as a mineral oil, esters of carboxylic acids, monohydric alcohols, vegetable oils, polyoxypropylene and polyoxybutylene glycols; (B) an organopolysiloxane compound selected from a hydroxyl endblocked dimethylpolysiloxane fluid or a benzene soluble organopolysiloxane resin; (C) a silica filler; and (D) a compound selected from a hydrocarbon amine, ammonia or a disilazane.

An emulsion defoamer composition is also described in U.S. Pat. No. 4,225,456 to Schmidt et al which contains (A) hydrophobic silica; (B) an amide; (C) an organic polymer; (D) an emulsifier; (E) an oil, such as a mineral oil; (F) a silicone oil; and (G) water.

In contrast to the antifoam compositions described heretofore, the antifoam compositions of this invention have certain advantages. For example, emulsions of these antifoam compositions are more effective in an alkali medium and their effectiveness lasts for a longer period of time. Also, emulsions of this invention have a longer shelf-life, have better thermal stability and are more stable to mechanical stresses such as shear stresses. Moreover, the antifoam compositions of this invention are more effective in controlling foam formation in, for example, the evaporation of alkaline black liquor in the paper industry, textile dyeing, sewage disposal and in the concentration of synthetic rubber latices.

Therefore, it is an object of the present invention to provide a novel antifoaming composition which prevents or abates undesirable foaming in aqueous and nonaqueous systems. Another object of the present invention is to provide an antifoam composition having a longer shelf-life and better thermal stability. Still another object of the present invention is to provide an antifoam composition which is easily emulsified to form an aqueous or nonaqueous emulsion. A further object of the present invention is to provide an antifoam composition which is more effective in controlling foam formation.

SUMMARY OF THE INVENTION

The foregoing objects and others which will become apparent from the following description are accomplished in accordance with this invention, generally speaking, by providing foam destabilizing compositions for aqueous and nonaqueous systems comprising (A) a foam destabilizing agent containing (1) a diorganopolysiloxane having the average formula

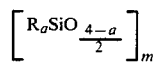

$$\left[ R_a SiO_{\frac{4-a}{2}} \right]_m$$

and (2) an amine containing compound selected from the group consisting of an aminofunctional organopolysiloxane and/or an organic amine having the formula

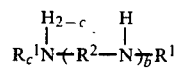

$$R_c^1 N + R^2 - N \frac{}{b} R^1$$
with $H_{2-c}$ on the first N and $H$ on the second N where R is a monovalent hydrocarbon radical having from 1 to 50 carbon atoms, in which an average of at least one R group contains from 6 to 50 carbon atoms, $R^1$ is a monovalent hydrocarbon radical having from 1 to 25 carbon atoms, $R^2$ is a divalent hydrocarbon radical having from 1 to 10 carbon atoms, with the proviso that at least one of the radicals is represented by $R^1$ or $R^2$ must have at least 6 carbons, a has an average value of from about 1.8 to 2.2, b is 0, 1 or 2, c is 0 or 1, and m has a value greater than 3; (B) a nonaqueous dispersing agent; (C) an inorganic filler; and (D) water, if desired.

DESCRIPTION OF THE INVENTION

The foam destabilizing composition of this invention comprises (A) from 0.75 to 40 weight percent of a foam destabilizing agent based on the weight of the foam destabilizing composition, in which the foam destabilizing agent contains (1) a diorganopolysiloxane in an amount of from 4 to 96 weight percent based on the weight of the foam destabilizing agent and (2) an amine compound selected from the group consisting of an organic amine and/or an aminofunctional organopolysiloxane; in an amount of from 96 to 4 weight percent based on the weight of the destabilizing agent;

(B) from 1 to 98.75 weight percent based on the weight of the composition of a nonaqueous dispersing agent;

(C) from 0.5 to 60 weight percent of an inorganic filler; and (D) from 0 to 18 weight percent of water based on the weight of the foam destabilizing composition.

The diorganopolysiloxane employed in the foam destabilizing agent may be represented by the general formula

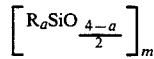

$$\left[ R_a SiO_{\frac{4-a}{2}} \right]_m$$

where R is a monovalent hydrocarbon radical having from 1 to 50 carbon atoms, in which at least one R group contains from 6 to 50 carbon atoms, and the remaining R groups have from 1 to 5 carbon atoms, a has an average value of from about 1.8 to 2.2 and m has an average value greater than 3.

It is preferred that the ratio of R groups having from 1 to 5 carbon atoms to R groups having from 6 to 50 carbon atoms range from 1:2.5 to 5600:1, preferably from 10:1 to 5000:1, and more preferably from 10:1 to 100:1.

The diorganopolysiloxanes may be either linear or branched siloxanes having an average of from about 1.8 to 2.2 organic radicals per silicon atom. The diorganopolysiloxanes may be fluids or gums having a viscosity of from 5 to 1,000,000 mPa.s at 25° C. and more preferably from 100 to 500,000 mPa.s at 25° C. Also, it is possible to blend high and low viscosity fluids to form a fluid having the desired viscosity range.

Examples of suitable monovalent hydrocarbon radicals represented by R are alkyl radicals such as ethyl, propyl, isopropyl, butyl, isobutyl, isopentyl, hexyl, octyl, decyl, dodecyl, tetradecyl, hexadecyl, octadecyl, eicosyl, docosyl, tetracosyl, hexacosyl, octacosyl, triacontyl, dotriacontyl, tetracontyl and pentacontyl radicals; alkenyl radicals such as vinyl, allyl, 2-butenyl, 2-pentenyl, and cyclohexenyl radicals; aryl radicals such as the phenyl and naphthyl radicals; alkaryl radicals such as the tolyl, xylyl, cumenyl, mesityl, ethylphenyl, methyl- α-naphthyl and 1-ethyl-B-naphthyl radicals; and aralkyl radicals, such as the benzyl, alpha-phenyl-ethyl, alpha-phenyl-propyl, alpha-phenyl-isopropyl, alpha-phenyl-butyl, alpha-phenyl-isobutyl and beta-phenyl-sec-butyl radicals.

Examples of linear diorganopolysiloxanes which may be used are those that are terminated with $R_3'SiO_{0.5}$ units, in which $R'$ is the same as R above or a hydroxyl group or a hydrocarbonoxy radical. Specific examples of preferred diorganopolysiloxanes which may be employed are triorganosiloxy terminated diorganopolysiloxanes such as trimethylsiloxy terminated methylhexylpolysiloxanes, methyloctylpolysiloxanes, methyldecylpolysiloxanes, methyloctadecylpolysiloxanes, methylphenylpolysiloxanes, methyltriacontylpolysiloxanes, methyltetracontylpolysiloxanes and copolymers of said diorganopolysiloxanes and organosiloxanes in which the organic groups have from 1 to 4 carbon atoms. Also, hydroxyl, alkoxy or aryloxy terminated diorganopolysiloxanes may be employed.

The organic amine which may be employed in the foam destabilizing agent may be represented by the general formula

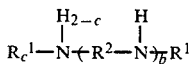

where the $R^1$, which may be the same or different, is a saturated or unsaturated monovalent hydrocarbon radical having from 1 to 25 carbon atoms, $R^2$ is a divalent hydrocarbon radical having from 1 to 10 carbon atoms, with the proviso that at least one of the radicals represented by $R^1$ or $R^2$ must have at least 6 carbon atoms, b is 0, 1 or 2 and c is 0 or 1.

Examples of monovalent hydrocarbon radicals represented by $R^1$ are alkyl radicals such as methyl, ethyl, propyl, butyl, pentyl, hexyl, octyl, dodecyl and octadecyl radicals; alkenyl radicals, such as vinyl, allyl, 1-butenyl, 2-butenyl, 1-isobutenyl, 2-pentenyl, 1-hexenyl, 2-hexenyl, octenyl, and decenyl radicals; aryl radicals, such as the phenyl radical; alkaryl radicals, such as tolyl, xylyl, o-cumenyl, m-cumenyl, p-cumenyl and the ethylphenyl radical and aralkyl radicals, such as benzyl, phenyl-ethyl, phenyl-propyl and the phenyl-butyl radicals.

Examples of saturated and unsaturated divalent hydrocarbon radicals represented by $R^2$ are alkylene radicals such as ethylene, trimethylene, tetramethylene, hexamethylene, octamethylene and decamethylene radicals; alkenylene radicals such as propenylene, butenylene, hexenylene, octenylene and decenylene radicals and aryl radicals such as the phenylene radical.

Suitable examples of organic amines are aniline, m-toluidine, 2,3-xylidine, N-ethyl-N-methyl-hexylamine, N,N-dimethyl-hexylamine, N-hexyl-allylamine, N-hexylamine, dipropylamine, N,N-dimethyl-phenylamine, N-phenyl-benzylamine, N-cyclohexylhexylamine, benzylamine, phenethylamine, 1-naphthalenemethylamine, and diamines, such as

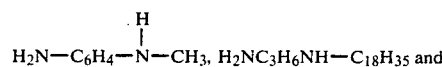

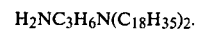

Aminofunctional polysiloxanes which may be employed in the foam stabilizing agent have at least one unit of the general formula

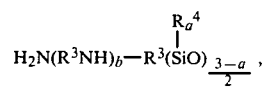

where $R^3$, which may be the same or different, is a divalent hydrocarbon radical selected from the group consisting of saturated divalent hydrocarbon radicals having from 2 to 10 carbon atoms, a divalent hydrocarbonoxy radical in which the oxygen is in the form of an ether linkage and an unsaturated divalent hydrocarbon radical having from 2 to 10 carbon atoms, $R^4$ is a monovalent hydrocarbon radical having from 1 to 18 carbon atoms, a and b are the same as above.

Examples of suitable divalent hydrocarbon radicals represented by $R^3$ are alkylene radicals having from 2 to 10 carbon atoms such as ethylene, trimethylene, tetramethylene, hexamethylene and octamethylene radicals. The divalent hydrocarbonoxy radicals may be represented by the general formula, $(-OC_2H_4-)_d$, $(-OC_2H_4OCH_2-)_d$ and $(-OCH_3H_6-)_d$ in which d is a number of from 1 to 30, such as ethylene oxide, trimethylene oxide and polymers thereof. Examples of suitable unsaturated divalent hydrocarbon radicals are alkenylene radicals such as vinylene, propenylene, butenylene, hexenylene, octenylene and decenylene radicals.

The aminofunctional siloxanes may be prepared by equilibrating a mixture containing an organopolysiloxane and an aminofunctional silane or siloxane in the presence of an equilibration catalyst. Organopolysiloxanes which may be used in the preparation of these aminofunctional siloxanes are cyclic siloxanes having the general formula

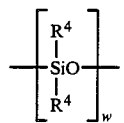

or linear or branched organopolysiloxanes having the general formula

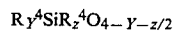

in which $R^4$ represents monovalent hydrocarbon radicals having from 1 to 18 carbon atoms, y is a number of from about 0.5 to 3.0, z is a number of from 0.001 to 1 and the sum of y and z is a number of from 1 to 3 and w is a number of from 3 to 10.

Examples of suitable cyclic organopolysiloxanes which may be used in the formation of these aminofunctional silicone fluids are hexamethylcyclotrisiloxane, hexaphenylcyclotrisiloxane, 1,2,3-trimethyl-1,2,3-triphenylcyclotrisiloxane, 1,2,3-trimethyl-1,2,3-trivinylcyclotrisiloxane, octamethylcyclotetrasiloxane, 1,2,3,4-tetramethyl-1,2,3,4-tetravinylcyclotetrasiloxane and the like. Cyclic siloxanes in which w has a value from 3 to 4 are preferred.

Examples of linear or branched chained siloxanes which may be used are triorganosiloxy end-blocked organopolysiloxanes such as trimethylsiloxy end-blocked dimethylpolysiloxanes, diethylpolysiloxanes, methylphenylpolysiloxanes, diphenylpolysiloxanes and copolymers thereof.

Examples of suitable aminofunctional silanes are beta-aminopropyltriethoxysilane, gamma-aminopropyltrimethoxysilane, methyl-beta-(aminoethyl) gamma-aminopropyldimethoxysilane, omega-aminohexyltributoxysilane, beta-(aminoethoxy)hexyltriethoxysilane, beta-(aminopropoxy)butyltributoxysilane, methyl-beta-(aminopropoxy)propyldi-(aminoethoxy)silane, and silanes of the formula

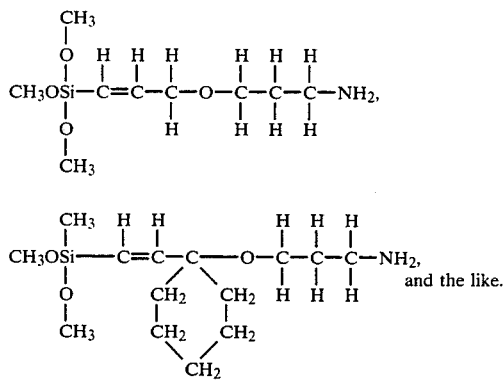

Representative examples of aminofunctional siloxanes are

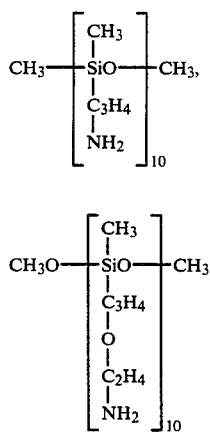

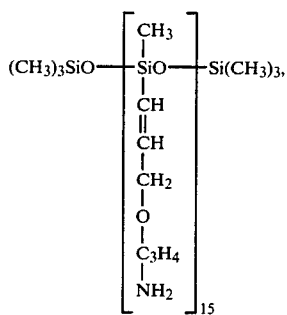

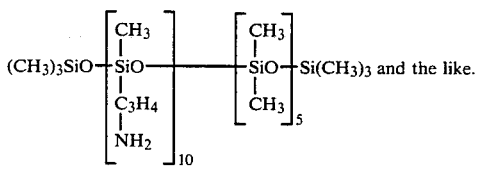

The aminofunctional siloxanes and methods for preparing the same are described in U.S. Pat. No. 3,890,269 to Martin, which is incorporated herein by reference.

Other aminofunctional siloxanes which may be used are those obtained from the reaction of polyaminoalkyl alkoxysilanes of the formula $$R_f^4(E_hM)Si(OR^4)_{3-f}$$

or the corresponding siloxanes with organosiloxanes of the general formula $$R_x^4Si(OH)_nO_{4-n-x/2}$$

where $R^4$ is the same as above, M is an aliphatic hydrocarbon radical having from 1 to 10 carbon atoms and having a valence of $h+1$, where h is a number of from 1 to 3, E is a monovalent radical attached to M by a carbon-nitrogen bond and is composed of carbon, nitrogen and hydrogen atoms and contains at least one amine group, f is a number of from 0 to 2, n has a positive average value up to and including 2, and x is a number of from about 0.5 to 2.49 and the sum of n and x has an average value up to and including 3.

These aminofunctional siloxane copolymers may be prepared by contacting the aminofunctional silanes or the corresponding siloxanes with the organosiloxane in a liquid phase in accordance with the procedure described in U.S. Pat. No. 3,355,424 to Brown, which is incorporated herein by reference.

Other aminofunctional siloxanes which may be used are tertiary aminoorganosilanes or siloxanes which have at least one ether linkage in the organic group connecting the tertiary amino group to the silicon atoms.

These tertiary aminoorganosiloxanes may be prepared by a platinum catalyzed addition reaction of an alkenyl ether of a tertiary hydroxyalkyl amine and a hydrosilicon compound (i.e., a silane or siloxane containing silicon-bonded hydrogen) in accordance with the procedure described in U.S. Pat. No. 3,402,191 to Morehouse.

Other aminofunctional siloxanes which may be used are those derived from the condensation and/or the partial hydrolysis and condensation of a liquid silanol chain-stopped polydiorganosiloxane and an aminoalkoxyalkylsilane or an aminoalkoxyalkenylsilane having the formula

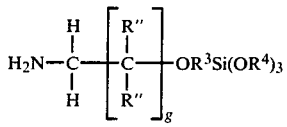

and, if desired, aminoalkylsilanes or from the condensation of the above liquid silanol chain-stopped polydiorganosiloxane with the above aminofunctional silanes in various mole ratios. In the above formula R" is a monovalent hydrocarbon radical having from 1 to 18 carbon atoms or hydrogen; $R^3$ and $R^4$ are the same as above and g is a number of from 1 to 10. These aminofunctional siloxanes may be prepared in accordance with the procedure described in U.S. Pat. No. 3,544,498 to Holdstock et al in which a mixture containing the silanol chain-terminated polyorganosiloxane and the aminoalkoxyalkylsilane or aminoalkyoxyalkenylsilane and, if desired, the aminoalkylsilane are partially hydrolyzed and condensed. Also, the aminofunctional organopolysiloxanes may be prepared in accordance with the procedure described in U.S. Pat. No. 3,355,424 to Brown in which an aminofunctional silane and silanol chain-stopped polyorganosiloxanes are condensed.

The viscosity of the aminofunctional siloxanes may range from about 5 up to about 100,000 mPa.s at 25° C., preferably from about 50 to 50,000 mPa.s and more preferably from about 100 to 20,000 mPa.s at 25° C.

The foam destabilizing agent, which consists of a mixture of a diorganopolysiloxane and an amine compound is present in the foam destabilizing composition in an amount of from 0.75 to 40 percent by weight, preferably from 2 to 35 percent by weight and more preferably from 5 to 30 percent by weight based on the weight of the foam destabilizing composition.

The diorganopolysiloxane is present in the foam destabilizing agent in an amount of from 4 to 96 percent, preferably from 15 to 75 percent by weight based on the weight of the foam destabilizing agent.

The amine compound is present in the foam destabilizing agent in an amount of from 96 to 4 percent, preferably from 90 to 10 percent based on the weight of the foam destabilizing agent.

Any nonaqueous liquid which does not substantially interfere with the effectiveness of the foam destabilizing agent may be employed in the compositions of this invention. Nonaqueous liquids such as a liquid petrolatum, vegetable oils, diorganopolysiloxane fluids, carboxylic acid esters having from about 14 to about 24 carbon atoms and monohydric alcohols having from 8 to 18 carbon atoms and mixtures thereof may be employed in the compositions as dispersing agents.

It is preferred that the liquid petrolatum (mineral oil) have a viscosity of from about 10 to 200 mPa.s at 25° C.

Vegetable oils which are employed in the compositions as dispersing agents are generally derived from the seeds of plants and generally are mixtures of mixed glycerides. Preferably, the vegetable oils have a viscosity of from about 10 to 200 mPa.s at 25° C.

Diorganopolysiloxane fluids which may be employed as nonaqueous dispersing agents in the antifoam compositions are trialkylsiloxy endblocked diorganopolysiloxanes having a viscosity of from about 10 to 5000 mPa.s at 25° C. and more preferably from about 100 to 4000 mPa.s at 25° C. Examples of suitable diorganopolysiloxanes are trimethylsiloxy endblocked dimethylpolysiloxanes, triethylsiloxy endblocked diethylpolysiloxanes, and copolymers having dimethylsiloxane units and diphenylsiloxane units or methylphenyl and dimethylsiloxane units. Preferably, the organopolysiloxanes are trimethylsiloxy endblocked polydimethylsiloxanes. These organopolysiloxane fluids are well-known in the art and generally consist predominantely of diorganosiloxane units ($R_2^4SiO$).

Preferably, the carboxylic acid esters employed in the compositions of this invention have from 14 to 24 carbon atoms and more preferably from 16 to 20 carbon atoms. Suitable examples of carboxylic acid esters which may be used are isobutyl stearate, isobutyl palmitate, butyl oleate, isocetyl stearate and butoxethyl stearate.

Examples of monohydric alcohols which may be employed are octyl alcohol, 1-decyl alcohol, lauryl alcohol, myristyl alcohol, cetyl alcohol, stearyl alcohol, and tallow alcohol.

The amount of nonaqueous dispersing agent present in the foam destabilizing composition may range from 1 to 99 percent by weight, preferably from 2 to 90 percent by weight and more preferably from 5 to 80 percent by weight based on the weight of the foam destabilizing composition.

The fillers used in the antifoams of this invention may be any fillers which have been or could have been used heretofore in the preparation of antifoams containing an organopolysiloxane and a filler. Examples of such fillers are titanium oxide, calcium carbonate, aluminum oxide, ground quartz, talc, magnesium oxide, zinc oxide and finely divided silicas which have a particle size that does not exceed 25 microns.

The preferred silicas are pyrogenically prepared or precipitated silicon dioxide having a surface area of from about 150 m²/g up to about 350 m²/g. Additional examples of fillers which may be used in this invention are lithium stearate and magnesium aluminum silicate. Other fillers which may be used are products which remain solid at least at the temperature at which the antifoam is to be used and which are obtained from the reaction of at least one monovalent or polyvalent isocyanate with at least one organic compound containing at least one hydrogen atom which can react with the isocyanate group, such as the reaction product of naphthylene diisocyanate and cyclohexylamine. It is preferred that fillers prepared from the isocyanate and the organic compound be prepared in the presence of an organopolysiloxane containing dihydrocarbon siloxane units. Mixtures of various fillers as well as treated fillers may be employed in the antifoams of this invention.

The amount of inorganic filler may range from about 0.5 to 60 percent by weight, preferably from 1 to 50 percent by weight and more preferably from 5 to 40 percent by weight based on the weight of the foam destabilizing composition.

The defoamer compositions of this invention need not contain water in order to be an effective antifoam. Oftentimes, it is preferred that the composition be free of water. However, when water is present, it generally ranges from about 0 to 18 percent by weight, preferably from 2 to 15 percent by weight and more preferably from 5 to 12 percent by weight based on the weight of the foam destabilizer composition.

When the foam destabilizing compositions of this invention are emulsified with water, it is preferred that an emulsifying agent be employed. Water-soluble emulsifiers are well-known. Nonionic emulsifiers are preferred, especially those which are liquid at room temperature or melt on moderate heating under the conditions of the process of this invention. Mixtures of such emulsifiers may also be used. Examples of nonionic emulsifiers which may be used are ethoxylated fatty alcohols, ethoxylated fatty acids, ethoxylated fatty esters of polyols, such as, glycerol, sorbitol, or sorbitan, ethoxylated alkyl phenols, polyethers containing ethylene oxide and propylene oxide groups and water-soluble silicon polyethers. Watersoluble polyoxyalkylenepolysiloxane block copolymers are especially suitable. Furthermore, ethoxylated amines, amides, or amidoamines may be used. Ionic, water-soluble surfactants can also be used. Of the anionic surfactants, the sulfates and sulfonates of organic compounds must be especially mentioned. As cationic compounds, quaternary ammonium compounds with longchain alkyl residues, as well as betaines, are suitable.

The amount of emulsifying agent present in the destabilizing compositions may range from about 2 to 30 percent, preferably from 3 to 25 percent and more preferably from about 5 to 20 percent by weight, based on the weight of the destabilizing agent.

The foam destabilizing compositions of this invention may be prepared in any conventional manner. Although the addition of the ingredients is not critical, it is preferred that the foam destabilizing agent be mixed with the nonaqueous dispersing agent, followed by the addition of the inorganic filler. When water is added to the composition, it is preferred that the water and emulsifying agent be added prior to the addition of the inorganic filler. The ingredients can be handmixed or they can be mixed in any suitable mechanical mixer, such as a leaf or disk stirrer, or a planetary mixer. The antifoam composition can be prepared at room temperature and at atmospheric pressure. However, if desired, higher or lower temperatures as well as higher or lower pressures may be used. However, temperatures in excess of about 100° C. should be avoided.

Preferably, the destabilizing compositions are prepared at elevated temperatures, such as from 25° to about 100° C. and more preferably from about 30° to about 80° C.

Other ingredients which may be added to the foam destabilizing compositions of this invention are thickening agents such as water-soluble cellulose derivatives. Examples of suitable water-soluble cellulose derivatives are sodium or potassium salts of cellulose esters, such as cellulose sulfate and cellulose ethers, such as sodium carboxymethylcellulose, sodium carboxyethylcellulose, methylcellulose, hydroxyethyl methylcellulose, hydroxypropyl methylcellulose, hydroxyethylcellulose, hydroxypropylcellulose, hydroxyethyl sodium carboxymethylcellulose, ethylcellulose and sodium carboxymethylmethylcellulose. The preferred water-soluble cellulose derivatives are methylcellulose and cellulose derivatives containing sodium and carboxymethyl groups, such as sodium carboxymethylcellulose. Mixtures of various water-soluble cellulose derivatives may also be employed in the foam destabilizer compositions of this invention.

Preferably, the water-soluble cellulose derivatives are used in amounts of from 2 to 30 percent by weight and more preferably from 10 to 25 percent by weight, based on the weight of the foam destabilizing agent.

Preservatives such as formaldehyde and 6-acetoxy-2,4-dimethyl-m-dioxane and coloring agents may be added in minor amounts to the compositions of this invention.

The foam destabilizing compositions prepared in accordance with the present invention are suitable for defoaming nonaqueous as well as aqueous systems. They are preferably used in aqueous systems. Aqueous systems in which these foam destabilizer compositions may be employed are pulp and paper mill effluents in latex systems, in dispersion dyes, in synthetic resin dispersions, textile dyes, including jet dyeing, effluent clarification, fermentation processes, waste-water treatment, paints, laundry and detergent products. These compositions may also be used in lubricants and with cutting oil emulsions.

The following apparatus and test method was used in determining the effectiveness of the various compositions in the reduction of existing foam (knock-down) and prevention of foam formation (hold-down) which occurs in various liquids. The apparatus and method may be used for testing any liquid which forms a foam upon agitation and/or heating.

The defoaming properties (knock-down) of the composition is determined by adding about 100 milliliters of a one percent detergent solution (Triton X-100, Registered Trademark, Rohm and Haas Co.) to an 8 ounce bottle, capped and vigorously agitated for about 10 seconds. Then about 0.03 milliliters of the foam destabilizing composition are added to the bottle and the foam height measured after 1 minute.

Antifoaming properties (hold down) are determined by adding 100 milliliters of 0.25 percent detergent solution (Triton X-100, Registered Trademark, Rohm & Haas Co.) and 0.2 milliliters of the foam destabilizing compositions to a 500 milliliter graduated cylinder and stoppered. The cylinder is inverted 10 times, and then allowed to stand 15 seconds. A gas dispersion tube with nitrogen flowing at approximately 15 milliliters per second is immersed into the detergent solution mixture. The time required for the foam height to reach the 500 milliliter graduation mark is measured.

The aminofunctional organopolysiloxanes used in the examples are prepared in the following manner. In the following examples all parts are by weight unless otherwise specified.

(A) An amino functional organopolysiloxane fluid is prepared by equilibrating a mixture containing 495.2 parts of N-beta(aminoethyl)-gamma-aminopropyltrimethoxysilane, 495.8 parts of octamethylcyclotetrasiloxane and 5 parts of potassium hydroxide at 145° C. for three hours. The reaction mixture is cooled to room temperature and 5.0 parts of acetic acid are added to neutralize the catalyst. The resultant product is filtered and the mole percent amine determined by titration.

($A_1$) The procedure described in (A) above is repeated except that 247.3 parts of N-beta (aminoethyl)-gamma-aminopropyltrimethoxysilane are equilibrated with 742.7 parts of octamethylcyclotetrasiloxane.

($A_2$) The procedure described in (A) above is repeated except that 89.9 parts of N-beta(aminoethyl)-gamma-aminopropyltrimethoxysilane are equilibrated with 900.1 parts of octamethylcyclotetrasiloxane.

($A_3$) The procedure described in (A) above is repeated except that 47.1 parts of N-beta (aminoethyl)-gamma-aminopropyltrimethoxysilane is equilibrated with 942.9 parts of octamethylcyclotetrasiloxane.

(A₄) The procedure described in (A) above is repeated except that 15.2 parts of N-beta(aminoethyl)-gamma-aminopropyltrimethoxysilane is equilibrated with 974.8 parts of octamethylcyclotetrasiloxane.

(A₅) The procedure described in (A) above is repeated except that 8.4 parts of N-beta(aminoethyl)-gamma-aminopropyltrimethoxysilane is equilibrated with 981.6 parts of octamethylcyclotetrasiloxane.

(A₆) The procedure described in (A) above is repeated except that 79.9 parts of gamma-aminopropyltrimethoxysilane is substituted for the N-beta(aminoethyl)-gamma-aminopropyltrimethoxysilane.

(A₇) The procedure described in (A) above is repeated except that 26.6 parts of gamma-aminopropyltrimethoxysilane is substituted for the N-beta(aminoethyl)-gamma-aminopropyltrimethoxysilane.

(A₈) The procedure described in (A) above is repeated except that 6.2 parts of gamma-aminopropyltrimethoxysilane is substituted for the N-beta(aminoethyl)-gamma-aminopropyltrimethoxysilane.

(A₉) The procedure described in (A) above is repeated except that 118.2 parts of bis-[N-beta(aminoethyl)]-gamma-aminopropyltrimethoxysilane is substituted for the N-beta(aminoethyl)-gamma-aminopropyltrimethoxysilane.

(A₁₀) The procedure described in (A) above is repeated except that 39.4 parts of bis-[N-beta(aminoethyl)]-gamma-aminopropyltrimethoxysilane is substituted for the N-beta(aminoethyl)-gamma-aminopropyltrimethoxysilane.

(A₁₁) An aminoorganopolysiloxane fluid is prepared by equilibrating a mixture containing 166.5 parts of N-beta(aminoethyl)-gamma-aminopropyltrimethoxysilane, 182.2 parts of hexamethyldisiloxane, 20.2 parts of water and 6.0 parts of potassium hydroxide at 145° C. while simultaneously removing the methanol as it is formed. The reaction mixture is cooled to room temperature and 6.0 parts of acetic acid are added to neutralize the catalyst. The resultant product is filtered and the mole percent of amine is determined by titration.

(A₁₂) The procedure of (A₁₁) above is repeated except that a mixture containing 47.6 parts of N-beta(aminoethyl)-gamma-aminopropyltrimethoxysilane, 952.4 parts of octamethylcyclotetrasiloxane, 52.1 parts of hexamethyldisiloxane and 5.8 parts of water are equilibrated.

(A₁₃) The procedure described in (A₁₁) above is repeated except that 18.9 parts of N-beta(aminoethyl)-gamma-aminopropyltrimethoxysilane, 981.1 parts of octamethylcyclotetrasiloxane, 20.7 parts of hexamethyldisiloxane and 2.3 parts of water are equilibrated.

(A₁₄) An aminofunctional organopolysiloxane fluid is prepared by heating a mixture containing 222.1 parts of N-beta-(aminoethyl)-gamma-aminopropyltrimethoxysilane and 329.7 parts of hydroxyl-terminated dimethylpolysiloxane where the hydroxyl content is 0.19 mole percent for 2.0 hours at 145° C. The methanol formed during the reaction is distilled off. The resultant product is cooled and the mole percent of amine determined by titration.

(A₁₅) The procedure described in (A₁₄) above is repeated except that 527.2 parts of hydroxyl-terminated dimethylpolysiloxane having a hydroxyl content of 0.13 mole percent is substituted for the hydroxyl-terminated dimethylpolysiloxane having a hydroxyl content of 0.19 mole percent.

(A₁₆) The procedure of (A₁₄) above is repeated except that 601.3 parts of hydroxyl-terminated dimethylpolysiloxane having a (hydroxyl content of 0.11 mole percent is substituted for the hydroxyl-terminated dimethylpolysiloxane having a hydroxyl content of 0.19 mole percent.

Preparation of diorganopolysiloxanes used in the following examples:

(B) A diorganopolysiloxane is prepared by heating 19.4 parts of methylhydrogenpolysiloxane (available from Union Carbide as L-31), 910.6 parts of octamethylcyclotetrasiloxane, 50.0 parts of hexamethyldisiloxane, and 20.0 parts of acid clay (available from Filtrol Corporation as Filtrol-13) at 80° C. for 4 hours. The acid clay is removed by vacuum filtration. To the filtrate is added 19.8 parts of tetradecene, 108.9 parts of an alpha olefin having more than 30 carbon atoms (available from Gulf Oil Corporation as Gulfteen "30+"), and sufficient chloroplatinic acid to provide 0.01 parts of elemental platinum and then heated from 100 to 120° C. for 8 hours.

(B₁) The procedure of (B) is repeated except that 20.5 parts of methylhydrogenpolysiloxane, 909.5 parts of octamethylcyclotetrasiloxane, 66.3 parts of tetradecene, and 1.8 parts of alpha olefin "30+" are substituted for the 19.4 parts of methylhydrogenpolysiloxane, 910.6 parts of octamethylcyclotetrasiloxane and 108.9 parts of the alpha olefin "30+".

(B₂) The procedure of (B₁) is repeated except that 53.6 parts tetradecene and 33.5 parts alpha olefin "30+" are substituted for the 66.3 parts of tetradecene and 1.8 parts of alpha olefin "30+".

(B₃) The procedure of (B) is repeated except that 575.0 parts of methylhydrogenpolysiloxane, 355.0 parts of octamethylcyclotetrasiloxane, 1859.4 parts of tetradecene and 47.4 parts of alpha olefin "30+" are substituted for the 19.4 parts of methylhydrogenpolysiloxane, 910.6 parts of octamethylcyclotetrasiloxane, 19.8 parts of tetradecene and 108.9 parts of alpha olefin "30+".

(B₄) The procedure of (B) is repeated except that 0.7 parts of tetradecene and 164.1 parts of alpha olefin "30+" are substituted for 19.8 parts of tetradecene and 108.9 parts of alpha olefin "30+".

(B₅) The procedure of (B) is repeated except that 69.7 parts of methylhydrogenpolysiloxane, 860.3 parts of octamethylcyclotetrasiloxane, 156.5 parts tetradecene, and 177.9 parts of alpha olefin "30+" are substituted for 19.4 parts of methylhydrogenpolysiloxane, 910.6 parts of octamethylcyclotetrasiloxane, 19.8 parts of tetradecene and 108.9 parts of alpha olefin "30+".

(B₆) The procedure of (B) is repeated except that 10.6 parts of methylhydrogenpolysiloxane, 919.4 parts of octamethylcyclotetrasiloxane, 23.8 parts of tetradecene, and 27.1 parts of alpha olefin "30+" are substituted for 19.4 parts of methylhydrogenpolysiloxane, 910.6 parts of octamethylcyclotetrasiloxane, 19.8 parts of tetradecene and 108.9 parts of alpha olefin "30+".

(B₇) The procedure of (B) is repeated except that 7.1 parts of methylhydrogenpolysiloxane, 922.9 parts of octamethylcyclotetrasiloxane, 15.9 parts of tetradecene, and 18.1 parts of alpha olefin "30+" are substituted for 19.4 parts of methylhydrogenpolysiloxane, 910.6 parts of octamethylcyclotetrasiloxane, 19.8 parts of tetradecene and 108.9 parts of alpha olefin "30+".

(B₈) The procedure of (B₅) is repeated except that 71.2 parts of tetradecene and 391.3 parts of alpha olefin "30+" are substituted for 156.5 parts of tetradecene and 177.9 parts of alpha olefin "30+".

(B₉) The procedure of (B₇) is repeated except that 7.2 parts of tetradecene and 39.9 parts of alpha olefin "30+" are substituted for 15.9 parts of tetradecene and 18.1 parts of alpha olefin "30+".

($B_{10}$) The procedure of ($B_6$) is repeated except that 17.3 parts of tetradecene and 43.3 parts of alpha olefin "30+" are substituted for 23.8 parts of tetradecene and 27.1 parts of alpha olefin "30+".

($B_{11}$) The procedure of (B) is repeated except that 31.6 parts of methylhydrogenpolysiloxane, 898.4 parts of octamethylcyclotetrasiloxane and 258.6 parts of alpha olefin "30+" are substituted for 19.4 parts of methylhydrogenpolysiloxane, 910.6 parts of octamethylcyclotetrasiloxane and 108.9 parts of alpha olefin "30+".

($B_{12}$) The procedure of (B) is repeated except that 16.8 parts of methylhydrogenpolysiloxane, 913.2 parts of octamethylcyclotetrasiloxane, 54.9 parts of tetradecene are substituted for 19.4 parts of methylhydrogenpolysiloxane, 910.6 parts of octamethylcyclotetrasiloxane and 19.8 parts of tetradecene. The 108.9 parts of alpha olefin "30+" are omitted.

($B_{13}$) The procedure of (B) is repeated except that 163.4 parts of methylhydrogenpolysiloxane, 766.6 parts of octamethylcyclotetrasiloxane, 1334.4 parts of alpha olefin "30+" are substituted for 19.4 parts of methylhydrogenpolysiloxane, 910.6 parts of octamethylcyclotetrasiloxane and 108.9 parts of alpha olefin "30+". The 19.7 parts of tetradecene are omitted.

($B_{14}$) The procedure of (B) is repeated except that 101.6 parts of methylhydrogenpolysiloxane, 828.4 parts of octamethylcyclotetrasiloxane, 331.9 parts of tetradecene are substituted for 19.4 parts of methylhydrogenpolysiloxane, 910.6 parts of octamethylcyclotetrasiloxane and 19.8 parts of tetradecene. The 108.9 parts of tetradecene are omitted.

($B_{15}$) The procedure of (B) is repeated except that 163.4 parts of methylhydrogenpolysiloxane, 766.6 parts of octamethylcyclotetrasiloxane and 228.8 parts of hexene are substituted for 19.4 parts of methylhydrogenpolysiloxane and 910.6 parts of octamethylcyclosiloxane and the 19.8 parts of tetradecene. The 108.9 parts of alpha olefin "30+" are omitted.

($B_{16}$) The procedure of (B) is repeated except that 630.5 parts of methylhydrogenpolysiloxane, 299.5 parts of octamethylcyclotetrasiloxane, 882.7 parts of hexene are substituted for 19.4 parts of methylhydrogenpolysiloxane, 910.6 parts of octamethylcyclotetrasiloxane and 19.8 parts of tetradecene. The 108.9 parts of alpha olefin "30+" are omitted.

($B_{17}$) The procedure of (B) is repeated except that 42.3 parts of methylhydrogenpolysiloxane, 887.7 parts of octamethylcyclotetrasiloxane, 345.5 parts of alpha olefin "30+" are substituted 19.4 parts of methylhydrogenpolysiloxane, 910.6 parts of octamethylcyclotetrasiloxane and 108.9 parts of alpha olefin "30+". The 19.8 parts of tetradecene are omitted.

($B_{18}$) The procedure of (B) is repeated except that 242.2 parts of methylhydrogenpolysiloxane, 687.8 parts of octamethylcyclotetrasiloxane, 791.2 parts of tetradecene are substituted for 19.4 parts of methylhydrogenpolysiloxane, 910.6 parts of octamethylcyclotetrasiloxane and 19.8 parts of tetradecene. The 108.8 parts of alpha olefin 30+ are omitted.

($B_{19}$) The procedure of (B) is repeated except that 42.3 parts of methylhydrogenpolysiloxane, 887.7 parts of octamethylcyclotetrasiloxane, 1.4 parts of tetradecene and 342.0 parts of alpha olefin "30+" are substituted for 19.4 parts of methylhydrogenpolysiloxane, 910.6 parts of octamethylcyclotetrasiloxane, 19.8 parts of tetradecene and 108.9 parts of alpha olefin "30+".

($B_{20}$) The procedure of (B) is repeated except that 6.7 parts of methylhydrogenpolysiloxane, 923.3 parts of octamethylcyclotetrasiloxane, 9.4 parts of hexene are substituted for 19.4 parts of methylhydrogenpolysiloxane, 910.6 parts of octamethylcyclotetrasiloxane and 19.8 parts of tetradecene. The 108.9 parts of alpha olefin "30+" are omitted.

($B_{21}$) The procedure of (B) is repeated except that 0.1 part of methylhydrogenpolysiloxane, 929.9 parts of octamethylcyclotetrasiloxane, 0.8 parts of alpha olefin "30+" are substituted for 19.4 parts of methylhydrogenpolysiloxane, 910.6 parts of octamethylcyclotetrasiloxane and 108.9 parts of alpha olefin "30+". The 19.8 parts of tetradecene are omitted.

($B_{22}$) The procedure of (B) is repeated except that 3.4 parts of methylhydrogenpolysiloxane, 926.6 parts of octamethylcyclotetrasiloxane, 4.8 parts of hexene are substituted for the 19.8 parts of methylhydrogenpolysiloxane, 910.6 parts of octamethylcyclotetrasiloxane and 19.8 parts of tetradecene. The 108.9 parts of alpha olefin "30+" are omitted.

EXAMPLE 1

To a flask containing 222.5 parts of mineral oil having a viscosity of 165 mPa.s at 25° C. is added with agitation 2.6 parts of a foam destabilizing agent containing 1.3 parts of the diorganopolysiloxane prepared in (B) above, in which the organic radicals consist of 1.76 mole percent of a hydrocarbon radical having more than 30 carbon atoms and 0.80 mole percent of a hydrocarbon radical having 14 carbon atoms, and 1.3 parts of the aminofunctional organopolysiloxane prepared in accordance with procedure (A) above, in which the amine content is 6.25 mole percent, 6.3 parts of water, and 24.18 parts of amorphous precipitated silica having a surface area of 150 m$^2$/g at a temperature of 25° C. for a period of 1.5 hours. The defoaming and antifoaming properties are determined in accordance with the procedure described above. The defoaming height is 25 mm and the antifoaming time is 203 seconds.

COMPARISON EXAMPLE $V_1$

To 222.5 parts of mineral oil having a viscosity of 165 mPa.s at 25° C. is added with agitation 1.3 parts of a foam destabilizing agent containing 1.3 parts of a diorganopolysiloxane in which the organic radicals consist of monovalent hydrocarbon radicals having 1.76 mole percent of a 30 carbon hydrocarbon radical and 0.80 mole percent of a 14 carbon hydrocarbon radical, 6.3 parts of water, and 24.8 parts of amorphous precipitated silica having a surface area of 150 m$^2$/g. The defoaming height is 70 mm and the antifoaming time is 25 seconds.

COMPARISON EXAMPLE $V_2$

The procedure described in Comparison Example ($V_1$) is repeated using 2.6 parts of the foam destabilizing agent. The defoaming height is 65 mm and the antifoaming time is 26 seconds.

COMPARISON EXAMPLE $V_3$

The procedure described in Comparison Example ($V_1$) above is repeated except that 1.3 parts of an aminofunctional organopolysiloxane prepared in accordance with the procedure described in (A) above are substituted for the organopolysiloxane as a foam destabilizing agent. The defoaming height is 70 mm and the antifoaming time is 26 seconds.

COMPARISON EXAMPLE V4

The procedure described in Comparison Example (V3) is repeated except that 2.6 parts of an aminofunctional organopolysiloxane prepared in accordance with the procedure described in (A) above are substituted for the organopolysiloxane as a foam destabilizing agent. The defoaming height is 70 mm and the antifoaming time is 24 seconds.

EXAMPLE 2

The procedure of Example (1) is repeated except that several diorganopolysiloxane copolymers containing from 6 to more than 30 carbon atoms are substituted for the diorganopolysiloxane of Example (1). The defoaming and antifoaming properties are shown in Table I.

TABLE I
Defoaming and Antifoaming Properties

| Example No. | Diorganopolysiloxane Copolymers | | | | Defoaming Height (mm) | Antifoaming Time (seconds) |
|---|---|---|---|---|---|---|
| | Organic Radicals | | Organic Radicals | | | |
| | Number of carbon atoms | Mole Percent | Number of carbon atoms | Mole Percent | | |
| $B_1$ | 30+ | 0.03 | 14 | 2.67 | 20 | 42 |
| $B_2$ | 30+ | 0.54 | 14 | 2.16 | 15 | 75 |
| $B_3$ | 30+ | 0.67 | 14 | 66.00 | 65 | 24 |
| $B_4$ | 30+ | 2.67 | 14 | 0.03 | 25 | 491 |
| $B_5$ | 30+ | 2.84 | 14 | 6.25 | 50 | 341 |
| $B_6$ | 30+ | 0.44 | 14 | 0.97 | 25 | 46 |
| $B_7$ | 30+ | 0.29 | 14 | 0.65 | 18 | 55 |
| $B_8$ | 30+ | 6.25 | 14 | 2.84 | 20 | 357 |
| $B_9$ | 30+ | 0.65 | 14 | 0.29 | 20 | 75 |
| $B_{10}$ | 30+ | 0.70 | 14 | 0.70 | 25 | 64 |
| $B_{11}$ | 30+ | 4.17 | — | — | 45 | 57 |
| $B_{12}$ | 14 | 2.22 | — | — | 15 | 89 |
| $B_{13}$ | 30+ | 20.83 | — | — | 65 | 24 |
| $B_{14}$ | 14 | 13.16 | — | — | 40 | 40 |
| $B_{15}$ | 6 | 20.83 | — | — | 55 | 34 |
| $B_{16}$ | 6 | 72.22 | — | — | 30 | 29 |
| $B_{17}$ | 30+ | 5.56 | — | — | 10 | 729 |
| $B_{18}$ | 14 | 30.30 | — | — | 30 | 24 |
| $B_{19}$ | 30+ | 5.50 | 14 | 0.06 | 10 | 604 |
| $B_{20}$ | 6 | 0.89 | — | — | 50 | 28 |
| $B_{21}$ | 30+ | 0.02 | — | — | 15 | 37 |
| $B_{22}$ | 6 | 0.45 | — | — | 35 | 42 |

EXAMPLE 3

The procedure of Example 1 is repeated except that several aminofunctional organopolysiloxane fluids are substituted in the destabilizing agent of Example 1.

The aminofunctional organopolysiloxane fluids are prepared in accordance with the procedures described above. Table II illustrates the effect of the amine content on the defoaming and antifoaming properties.

TABLE II
Effect of Amine Content On Defoaming And Antifoaming Properties

| Example No. | Preparation of Aminofunctional Organopolysiloxane Example No. | *Mole Percent Amine | Parts Used In Destabilizing Agent | Defoaming Height (mm) | Antifoaming (Seconds) |
|---|---|---|---|---|---|
| 3(a) | (A) | 25.00 | 1.3 | 60 | 25 |
| 3(b) | ($A_1$) | 10.00 | 1.3 | 12 | 61 |
| 3(c) | ($A_2$) | 3.23 | 1.3 | 10 | 382 |
| 3(d) | ($A_2$) | 3.23 | 1.7 | 5 | 536 |
| 3(e) | ($A_3$) | 1.67 | 1.3 | 5 | 263 |
| 3(f) | ($A_3$) | 1.67 | 2.3 | 5 | 345 |
| 3(g) | ($A_4$) | 0.52 | 1.3 | 60 | 30 |
| 3(h) | ($A_4$) | 0.52 | 7.2 | 5 | 466 |
| 3(i) | ($A_5$) | 0.28 | 1.3 | 65 | 25 |
| 3(j) | ($A_5$) | 0.28 | 26.0 | 15 | 40 |
| 3(k) | ($A_{11}$) | 6.25 | 1.3 | 30 | 182 |
| 3(l) | ($A_{11}$) | 6.25 | 2.6 | 0 | 900 |
| 3(m) | ($A_{12}$) | 1.64 | 3.0 | 20 | 731 |
| 3(n) | ($A_{13}$) | 0.64 | 11.4 | 20 | 900 |
| 3(o) | ($A_{14}$) | 7.14 | 1.3 | 12 | 85 |
| 3(p) | ($A_{15}$) | 4.55 | 1.3 | 15 | 270 |
| 3(q) | ($A_{16}$) | 4.00 | 1.3 | 17 | 496 |

*1 mole of amine = $H_2NC_2H_4NHC_3H_6SiO_{3/2}$

EXAMPLE 4

The procedure of Example (1) is repeated except that 1.3 parts of the aminofunctional organopolysiloxane fluids prepared in accordance with Examples ($A_6$), ($A_7$) and ($A_8$) are employed in the defoaming and antifoaming compositions. The following table illustrates the effect of the amine content on the defoaming and antifoaming properties.

TABLE III
Effect Of Amine Content On Defoaming And Antifoaming Properties

| Aminofunctional polysiloxane fluid Example No. | *Mole Percent Amine | Defoaming Height (mm) | Antifoaming Time (Seconds) |
|---|---|---|---|
| ($A_6$) | 6.25 | 15 | 264 |
| ($A_7$) | 2.17 | 20 | 46 |
| ($A_8$) | 0.52 | 40 | 29 |

*1 mole of amine = $H_2NC_3H_6SiO_{3/2}$

EXAMPLE 5

The procedure of Example (1) is repeated except that 1.3 parts of aminofunctional organopolysiloxane fluids are used in the foam destabilizing compositions. The aminofunctional polysiloxane fluids are prepared in accordance with the procedure described in Examples ($A_9$), ($A_{10}$) and ($A_{11}$) above in which bis[N-beta(aminoethyl)]-gamma-aminopropyltrimethoxysilane is substituted for the N-beta(aminoethyl)-gamma-aminopropyltrimethoxysilane. The following table illustrates the defoaming height and antifoaming time for the resultant compositions.

TABLE IV

| Aminofunctional Polysiloxane Fluid Example No. | *Mole Percent Amine | Defoaming Height (mm) | Antifoaming Time (Seconds) |
|---|---|---|---|
| ($A_9$) | 6.25 | 37 | 30 |
| ($A_{10}$) | 2.17 | 20 | 80 |
| ($A_{11}$) | 0.52 | 70 | 24 |

*1 mole of amine = $H_2N(C_2H_4NH)_2C_3H_6SiO_{3/2}$

EXAMPLE 6

The procedure of Example (1) is repeated except that 3.9 parts of several organic amines are substituted for the aminofunctional organopolysiloxane fluid in the foam destabilizing agent. Table V illustrates the effect of the organic amines on the defoaming and antifoaming properties.

TABLE V

| Amine | *Base Equivalent Me/g | Defoaming Height (mm) | Antifoaming Time (Seconds) |
|---|---|---|---|
| N—coco-1,3-diaminopropane (Amine No. 387) | 13.8 | 0 | 121 |
| N—tallow-1,3-diamino propane (Amine No. 312) | 11.1 | 0 | 900 |
| N—oleyl-1,3-diaminopropane (Amine No. 312) | 11.1 | 0 | 900 |
| N—(hydrogenated-tallow)-amine (Amine No. 204) | 3.6 | 40 | 24 |
| Octadecylamine acetate (Amine No. 163) | 3.6 | 5 | 710 |
| Oleylamine (Amine No. 202) | 3.6 | 0 | 174 |
| Tallowamine (Amine No. 204) | 3.6 | 5 | 132 |
| N,N—dimethylsoyaamine (Amine No. 192) | 3.3 | 65 | 30 |
| N,N—di-(hydrogenated-tallow) amine (Amine No. 115) | 2.6 | 50 | 27 |

*milliequivalence base per gram of composition

COMPARISON EXAMPLE $V_5$

The procedure of Comparison Example ($V_1$) is repeated except that the foam destabilizing agent consists only of N-oleyl-1,3-diaminopropane (Amine No. 312), wherein the milliequivalence base per gram sample is 11.1. The defoaming height is 70 mm and the antifoaming time is 25 seconds.

EXAMPLE 7

The procedure of Example (1) is repeated except that the parts of diorganopolysiloxane and aminofunctional polysiloxane fluid are varied in the foam destabilizing agent. Table VI shows the parts of organopolysiloxane and aminofunctional organopolysiloxane used as the destabilizing agent, as well as the defoaming height and the antifoaming time.

TABLE VI

| Parts of Diorganopolysiloxane | Parts of Aminofunctional Organopolysiloxane | Defoaming Height (mm) | Antifoaming Time (Seconds) |
|---|---|---|---|
| 1.3 | 1.3 | 25 | 203 |
| 1.9 | 1.9 | 20 | 440 |
| 6.5 | 6.5 | 55 | 27 |
| 13.0 | 13.0 | 40 | 40 |
| 1.9 | 0.7 | 35 | 31 |
| 2.5 | 0.1 | 12 | 56 |
| 0.7 | 1.9 | 25 | 30 |
| 0.1 | 2.5 | 20 | 43 |

EXAMPLE 8

The procedure of Example (1) is repeated except that the foam destabilizing agent contains 1 part of the diorganopolysiloxane, 1 part of the aminofunctional organopolysiloxane described in (A) above, and 1 part of N-oleyl-1,3 diaminopropane (Amine No. 312), wherein the milliequivalence base per gram sample is 11.1. The defoaming height is 20 mm and antifoaming time is 212 seconds.

COMPARISON EXAMPLE $V_6$

The procedure of Example (1) is repeated except that 1.3 parts of N-oleyl-1,3-diaminopropane (Amine No. 312), in which the milliequivalence of base per gram of composition is 11.1 is substituted for the diorganopolysiloxane in the foam destabilizing agent. The defoaming height is 65 mm and the antifoaming time is 23 seconds.

EXAMPLE 9

The procedure of Example (1) is repeated except that foam destabilizing composition is prepared at 65° and at 100° rather than at 25° C. The defoaming height and antifoaming time is illustrated in the following table:

TABLE VII

| Temperature | Defoaming Height (mm) | Antifoaming Time (Seconds) |
|---|---|---|
| 65° C. | 20 | 39 |
| 100° C. | 50 | 39 |

EXAMPLE 10

A foam destabilizing composition is prepared by adding 2.6 parts of a foam destabilizing agent containing 1.3 parts of the diorganopolysiloxane of Example 1 and 1.3 parts of an aminofunctional organopolysiloxane prepared in accordance with the procedure described in (A) above, and 6.3 parts of water are added to 24.8 parts of amorphous precipitated silica having a surface area of 150 m²/g at 25° C. with agitation. The defoaming height is 60 mm and the antifoaming time is 20 seconds. When 222.5 parts of mineral oil having a viscosity of 165 mPa.s at 25° C. is added to the foam destabilizing composition prepared above, the defoaming height is 45 mm and the antifoaming time is 33 seconds.

EXAMPLE 11

The procedure of Example (10) is repeated except that the amorphous precipitated silica, foam destabilizing agent, and water are added to the mineral oil. The defoaming height is 40 mm and the antifoaming time is 78 seconds.

EXAMPLE 12

The procedure of Example (1) is repeated except that varying amounts of water are added to the compositions. The amount of water, defoaming height and antifoaming time is illustrated in the following table.

TABLE VIII

| Water (Parts) | Defoaming Height (mm) | Antifoaming Time (Seconds) |
|---|---|---|
| 0 | 20 | 37 |
| 2.5 | 15 | 93 |
| 24.8 | 30 | 76 |

EXAMPLE 13

The procedure of Example (1) is repeated except that varying amounts of amorphous precipitated silica are added to the compositions. The following table illustrates the defoaming height and antifoaming time.

TABLE IX

| Silica (Parts) | Defoaming Height (mm) | Antifoaming Time (Seconds) |
|---|---|---|
| 37.0 | 27 | 900 |
| 12.4 | 15 | 54 |
| 6.2 | 15 | 31 |

EXAMPLE 15

The procedure of Example (1) is repeated, except that 222.5 parts of each of the following dispersing agents are substituted for the mineral oil having a viscosity of 165 mPa.s at 25° C. Table X illustrates foaming height and antifoaming time for the various foam destabilizing compositions.

TABLE X

| Nonaqueous Dispersing Agents | Defoaming Height (mm) | Antifoaming Time (s) |
|---|---|---|
| Mineral oil, 14 mPa · s at 25° C. | 5 | 900 |
| Mineral oil, 40 mPa · s at 25° C. | 12 | 237 |
| Isocetyl stearate | 0 | 900 |
| Butoxyethyl stearate | 0 | 900 |
| 50/50 Isobutyl stearate/mineral oil 165 mPa · s at 25° C. | 0 | 900 |
| Isocetyl alcohol | 5 | 900 |
| Octyl alcohol | 6 | 345 |
| 50/50 Isocetyl alcohol/mineral oil, 165 mPa · s at 25° C. | 5 | 900 |
| Dimethylpolysiloxane 10 mPa · s at 25° C. | 5 | 900 |
| Dimethylpolysiloxane 1000 mPa · s at 25° C. | 5 | 900 |

What is claimed is:

1. A foam destabilizing composition comprising (A) a foam destabilizing agent consisting essentially of
   (1) a diorganopolysiloxane having terminal groups selected from the class consisting of hydroxyl, hydrocarbonoxy and triorganosiloxy groups and having the average formula

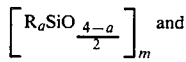

and (2) an amine containing compound selected from the group consisting of an aminofunctional organopolysiloxane having a viscosity of from 5 to 100,000 mPa.s at 25° C., an organic amine of the formula

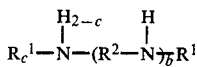

and mixtures thereof, where R is a monovalent hydrocarbon radical having from 1 to 50 carbon atoms, in which an average of at least one R group of the diorganopolysiloxane has from 6 to 50 carbon atoms and the remaining R groups have from 1 to 5 carbon atoms, in which the ratio of R groups radical having from 1 to 5 carbon atoms to R groups having from 6 to 50 carbon atoms range from 1:2.5 to 5600:1, $R^1$ is a monovalent hydrocarbon radical having from 1 to 25 carbon atoms, $R^2$ is a divalent hydrocarbon radical having from 1 to 10 carbon atoms per molecule, with the proviso that at least one of the radicals represented by $R^1$ or $R^2$ must have at least 6 carbon atoms, a has an average value of from about 1.8 to 2.2, b is 0, 1 or 2, c is 0 or 1, and m has an average value greater than 3, in which the diorganopolysiloxane (1) is present in the destabilizing agent in an amount of from 4 to 96 percent by weight and the amine containing compound (2) is present in the destabilizing agent in an amount of from 96 to 4 percent by weight based on the weight of the destabilizing agent; (B) a nonaqueous dispersing agent; and (C) an inorganic filler.

2. The foam destabilizing composition of claim 1, wherein the composition contains water.

3. The foam destabilizing composition of claim 1, wherein the destabilizing agent is present in an amount of from 0.75 to 40 percent by weight based on the weight of the destabilizing composition.

4. The foam destabilizing composition of claim 1, wherein the nonaqueous dispersing agent (B) is present in an amount of from 1 to 98.75 percent by weight based on the weight of the destabilizing composition.

5. The foam destabilizing composition of claim 1, wherein the inorganic filler is present in an amount of from 0.5 to 60 percent by weight based on the weight of the destabilizing composition.

6. The foam destabilizing composition of claim 2, wherein the water is present in an amount up to 18 percent by weight based on the weight of the destabilizing composition.

7. The foam destabilizing composition of claim 1, wherein the amine compound is an aminofunctional organopolysiloxane.

8. The foam destabilizing composition of claim 1, wherein the amine compound is an organic amine of the formula

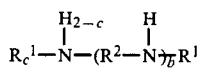

where $R^1$ is a monovalent hydrocarbon radical having from 1 to 25 carbon atoms, $R^2$ is a divalent hydrocarbon radical having from 1 to 10 carbon atoms per molecule, with the proviso that one of the radicals represented by $R^1$ or $R^2$ must have at least 6 carbon atoms, b is 0, 1 or 2 and c is 0 or 1.

9. The foam destabilizing composition of claim 2, wherein the composition contains an emulsifying agent.

10. The foam destabilizing composition of claim 1, wherein the filler has a surface area of from about 150 m²/g to 350 m²/g.

11. The foam destabilizing composition of claim 1, wherein the nonaqueous dispersing agent (B) is a diorganopolysiloxane fluid having a viscosity of from about 10 to 5000 mPa.s at 25° C.

12. The foam destabilizing composition of claim 1, wherein the nonaqueous dispersing agent (B) is a mineral oil having a viscosity of from 10 to 200 mPa.s at 25° C.

13. The foam destabilizing composition of claim 1, wherein the nonaqueous dispersing agent (B) is a carboxylic acid ester having from about 14 to 24 carbon atoms.

14. The foam destabilizing composition of claim 1, wherein the nonaqueous dispersing agent (B) is a monohydric alcohol having from 8 to 18 carbon atoms.

15. A foam destabilizing composition comprising (A) from 0.75 to 40 percent by weight based on the weight of the destabilizing composition of a foam destabilizing agent consisting essentially of
   (1) a diorganopolysiloxane having terminal groups selected from the class consisting of hydroxyl, hydrocarbonoxy and triorganosiloxy groups and having the average formula

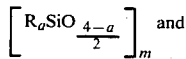 and (2) an amine containing compound selected from the group consisting of an aminofunctional organopolysiloxane, an organic amine of the formula

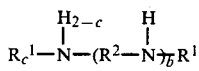

and mixtures thereof, where R is a monovalent hydrocarbon radical having from 1 to 50 carbon atoms, in which an average of at least one R group of the diorganopolysiloxane has from 6 to 50 carbon atoms and the remaining R groups have from 1 to 5 carbon atoms, in which the ratio of R groups having from 1 to 5 carbon atoms to R groups having from 6 to 50 carbon atoms range from 1:2.5 to 5600:1, $R^1$ is a monovalent hydrocarbon radical having from 1 to 25 carbon atoms, $R^2$ is a divalent hydrocarbon radical having from 1 to 10 carbon atoms per molecule, with the proviso that one of the radicals represented by $R^1$ or $R^2$ must have at least 6 carbon atoms, a has an average value of from about 1.8 to 2.2, b is 0, 1 or 2, c is 0 or 1, and m has an average value greater than 3, in which the diorganopolysiloxane (1) is present in the destabilizing agent in an amount of from 4 to 96 percent by weight and the amine containing compound (2) is present in the destabilizing agent in an amount of from 96 to 4 percent by weight based on the weight of the destabilizing agent; (B) a nonaqueous dispersing agent in an amount of from 1 to 98.75 percent by weight based on the weight of the destabilizing composition; and (C) an inorganic filler in an amount of from 0.5 to 60 percent by weight based on the weight of the destabilizing composition.

16. A process for preparing a foam destabilizing agent composition which comprises mixing a foam destabilizing agent consisting essentially of from 4 to 96 percent by weight based on the weight of the destabilizing agent of (1) a diorganopolysiloxane having terminal groups selected from the class consisting of hydroxyl, hydrocarbonoxy and triorganosiloxy groups and having the average formula

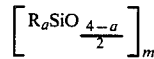

and from 96 to 4 percent by weight based on the weight of the destabilizing agent of (2) an amine containing compound selected from the group consisting of an aminofunctional organopolysiloxane, an organic amine of the formula

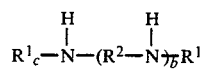

and mixtures thereof, where R is a monovalent hydrocarbon radical having from 1 to 50 carbon atoms, in which an average of at least one R group of the diorganopolysiloxane has from 6 to 50 carbon atoms and the remaining R groups have from 1 to 5 carbon atoms in which the ratio of R groups having from 1 to 5 carbon atoms to R groups having from 6 to 50 carbon atoms range from 1:2.5 to 5600:1, $R^1$ is a monovalent hydrocarbon radical having from 1 to 25 carbon atoms, $R^2$ is a divalent hydrocarbon radical having from 1 to 10 carbon atoms per molecule, with the proviso that one of the radicals represented by $R^1$ or $R^2$ must have at least 6 carbon atoms, a has an average value of from about 1.8 to 2.2, b is 0, 1 or 2, c is 0 or 1, and m has an average value greater than 3 with (B) a nonaqueous dispersing agent and thereafter adding (C) a filler to the resultant mixture.

* * * * *